Figure 1:
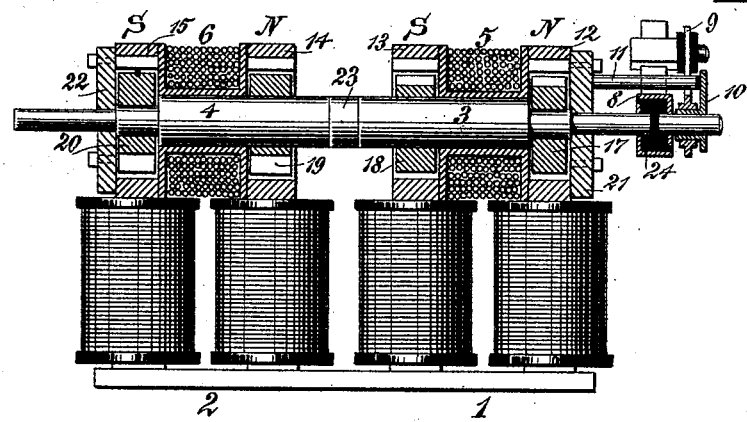

(No Model.)　　　　　　　　　　J. H. GUEST.　　　　　　　2 Sheets—Sheet 1.
ELECTRIC MOTOR.

No. 554,365.　　　　　　　　　　　　　　　　Patented Feb. 11, 1896.

WITNESSES:
Henry T. Hirsch.
William N. Capel.

INVENTOR:
John H. Guest.
by J. H. Townsend
ATTORNEY.

(No Model.)

J. H. GUEST.
ELECTRIC MOTOR.

No. 554,365.

2 Sheets—Sheet 2.

Patented Feb. 11, 1896.

WITNESSES:
Henry T. Hirsch.
William N. Capel.

INVENTOR:
John H. Guest by H. L. Townsend
ATTORNEY.

UNITED STATES PATENT OFFICE.

JOHN H. GUEST, OF BOSTON, MASSACHUSETTS.

ELECTRIC MOTOR.

SPECIFICATION forming part of Letters Patent No. 554,365, dated February 11, 1896.

Application filed December 23, 1893. Serial No. 494,608. (No model.)

*To all whom it may concern:*

Be it known that I, JOHN H. GUEST, a citizen of the United States, and a resident of Boston, in the county of Suffolk and State of Massachusetts, have invented a certain new and useful Electric Motor, of which the following is a specification.

My invention relates to electric motors having unwound armatures or simply rotating masses of metal, no energizing coil or coils being wound thereon or in any manner rotated therewith. This class of motor is of particular advantage for the propulsion of electric vehicles, as it has been found that the rapid deterioration of the armatures of street-car motors, for example, is due to the vibration of the armature-coils, consequent upon the shaking and jarring of the motor while said coils are in rapid rotation.

In my form of motor the energizing-coils for the armature are mounted on the motor-frame the same as are the field-magnets. This construction also provides for the employment of a lighter armature.

In carrying out this construction of motor it is most economical to form what is in reality a double motor. Two sets of field-magnets are provided and placed in line and a double armature is placed within the fields thereof, the exciting-coil for the double armature being divided, and one portion made to encircle one end thereof at one set of field-magnets, and the other portion made to encircle the other end at the other set of field-magnets, the two portions of the armature being insulated each from the other.

I preferably make my motor on a plan such that the field-magnets shall have polar extensions of like signs grouped together, the N. polar extensions being in one group and the S. polar extensions in another. I also arrange the corresponding polar projections of the armatures so that the groups of the N. and S. projections at one portion of the armature stand in a certain position and stagger, in relation thereto, the corresponding groups of N. and S. projections at the other portions of the armature. Then the pole-changing commutator is so arranged that the reversals of current in the oppositely-wound portions of the armature energizing-coil will take place at such intervals as to cause the attraction between the polar projections and extensions at one portion of the armature to co-operate with the repulsion between the staggered polar projections at the other portion of the armature and the corresponding polar extensions.

It consists in an electric motor having several sets of field-coils in which the polar extensions of each set are arranged in groups of like poles, and an armature whose polar projections are grouped in a like manner, and the projections in one group are staggered in relation to the corresponding projections in the other groups and the fixed armature-coil composed of sections wound in alternately-reversed directions.

My invention further consists in a motor provided with several sets of field-coils, in each of which the like polar extensions are grouped together, an armature having an equal number of sets of polar projections located in corresponding relation to the extensions of the field-coils, an armature exciting-coil having portions thereof located about the armature at the several sets of field-coils, respectively, and means for changing the relative directions of current in the armature exciting-coil and field-coils, respectively.

My invention further consists in other specific construction and combinations of parts, as hereinafter set forth.

Figure 2:
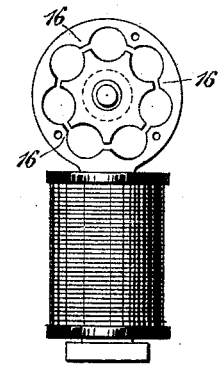
Figure 3:
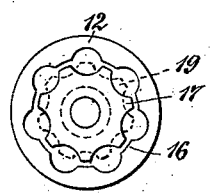
Figure 5:
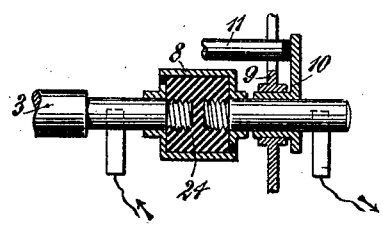
Figure 4:
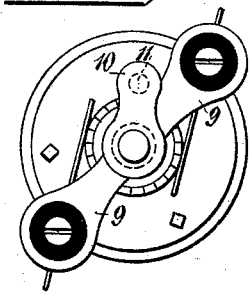
Figure 6:
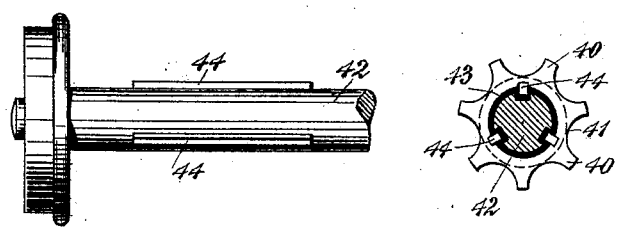
Figure 7:
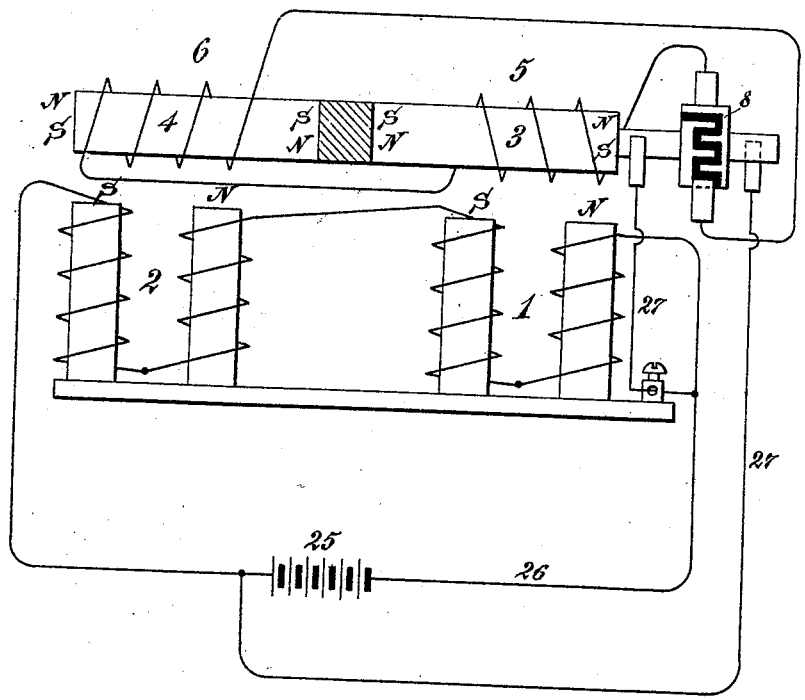
Figure 8:
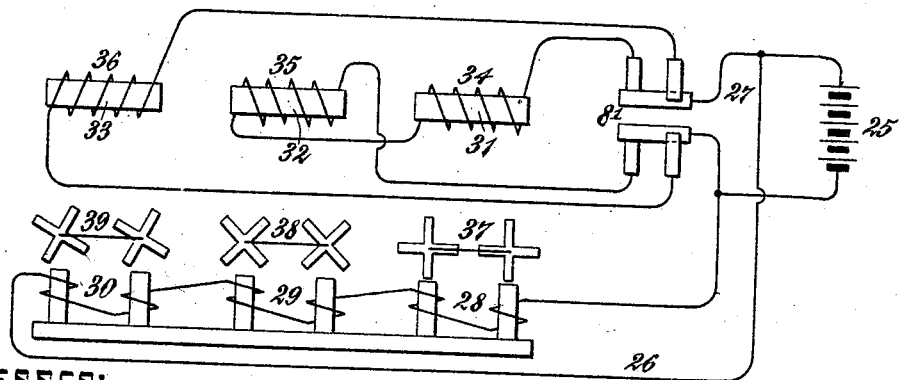

Referring to the accompanying drawings, which form a part of this specification and in which like reference-numerals indicate like parts, Figure 1 represents, in sectional elevation, one form in which I have embodied my invention. Fig. 2 is an end view thereof, the armature-bearing being removed. Fig. 3 is a representation of the relation of the polar projections of the armature and field-magnets. Fig. 4 is an elevation of the commutator and brush-supporting means. Fig. 5 is an axial section, on an enlarged scale, showing one way for insulating the commutator and the brush-support. Fig. 6 indicates the manner of attaching the armature projections to a car-axle. Fig. 7 is a conventional diagrammatic representation of my motor and its circuits. Fig. 8 is a like representation of a modification thereof.

In the drawings, 1 refers to one set of field-magnets, and 2 to the other set; 3, to one portion of the armature; 4, to the other; 5, to one portion of the armature exciting-coil; 6, to the other; 8, to the commutator; 9, to the yoke for the brushes; 10, to the supporting-arm for said yoke, and 11 to a post for supporting said arm.

In the preferred construction each set of field-magnets consists of two coils so wound that the right-hand coil of each presents an N. pole to the armature, and the left-hand coil an S. pole.

The field-magnet pole-pieces consist of rings 12 13 14 15, each of which is provided internally with a number of polar extensions 16, all of the extensions in each ring being, of course, of one polarity.

The armature consists preferably of a bar of iron or steel concentrically mounted in the axes of the polar rings and has formed thereon or secured thereto, within the plane of each polar ring, series of polar projections 17 18 19 20, corresponding in number and arrangement with the extension of the polar rings.

The bearings for the armature are formed in pieces 21 22, secured to the polar rings 12 and 15. The portions 3 and 4 of the armature are insulated from each other in any suitable manner, such insulation being indicated at 23.

The pole-changing commutator 8 is of the usual construction, but is secured to the armature in a novel manner, as shown in Fig. 5. The armature extension is separated by a block of insulation 24, into which are screwed the separated ends of the armature extension. The halves of the commutator are secured to the armature extension and have their overlapping projections embedded in the periphery of the insulation 24.

The post 11 is secured in any convenient way to the polar rings, and to its outer end is secured by means of a section of insulation the arm 10, which is sleeved upon the armature extension. Upon this sleeve of arm 10 is secured the collar of the brush-support 9, to which support the brushes are connected in an insulated manner in the usual way.

The sections of the armature-coil may be located in any suitable effective postion; but I have shown them in Fig. 1 as wound upon spools secured between the polar rings, so that the respective portions of the armature and the polar projections thereof will be as strongly polarized as though said sections were wound on the armature.

As indicated in the drawings, the rings 12 and 14 present N. polar extensions, while the rings 13 and 15 present S. polar extensions. The sections 5 and 6 of the armature exciting-coil are wound in opposition to one another, so that when the series of projections 17 and 20 are N. poles the series of projections 18 and 19 will be S. poles, and vice versa, as the current is reversed in the coil.

The series of polar projections 19 and 20 are staggered in their relation to the series 17 and 18, with the effect that when the projections 17 and 18 are receding from the extensions 16 of rings 12 and 13 the projections 19 and 20 will be approaching the extension 16 of rings 14 and 15, resulting in the co-operation of the action of repulsion at one portion of the armature and the action of attraction at the other portion thereof.

The commutator is so arranged as to change the direction of current in the armature-circuit at such intervals as to produce the proper conditions of polarity to provide for this co-operation of repulsion and attraction. These changes in polarity may be produced by reversals of current in either the field-magnets or in the armature exciting-coil, but I have illustrated the reversals as taking place in the latter. The changes of polarity consequent upon said reversals take place as follows: Referring to Fig. 3, which we will consider as representing the polar ring 12, whose extensions 16 are of the N. variety, and the armature projections 17 and 19, the latter projections will be respectively S. and N. as they stand. Then considering the armature to be rotating in the direction of the hands of a watch, as soon as the projections have moved slightly onward the polarity thereof will be reversed by the action of the commutator, and the projections 17, having become N. poles, are repelled by the poles 16 in the rear, and the projections 19, having become S. poles, are attracted to the poles 16 in advance, the polarities again changing as soon as the momentum has carried the projections 19 out of register with the extensions 16, and so on.

In Figs. 7 and 8 any source of energy is typified at 25, from which circuit 26 leads to the field-magnets, while circuit 27 leads to the commutator for the armature exciting-coil.

As indicated in Fig. 7, the rotation of the commutator reverses the current through coils 5 and 6, and so changes the poles of the armature, as above described. It is obvious that the armature might have fixed poles and the polarity of the field-coils be changed.

In Fig. 8 I have illustrated an arrangement wherein three sets of field-magnets 28 29 30 are employed, the armature and armature exciting-coil being divided into three corresponding sections 31 32 33 and 34 35 36, respectively. In this construction the polar projections on the several sections of the armature may be staggered in relation to each other, as indicated at 37 38 39, thus insuring a further and more effectual co-operation of the actions of attraction and repulsion.

This motor is particularly well adapted to use upon street-cars, where it is desired to mount the armature directly upon the car-axle, as the field-coils and armature exciting-coils may be located permanently upon the truck and the polar projections attached to the axle. In this construction the projections, as 40, Fig. 6, are formed upon a sleeve 41, (indicated in dotted lines,) and this is insulated from the axle 42 by a cylinder of insulation 43, which is rigidly connected to the sleeve and then secured to the axle, as by keys 44.

Obviously many changes might be made in the construction and arrangement of parts—as, for instance, in the field-magnets the members of each set might be separate from each other and each present but a single polar extension to opposite sides of the armature, and the armature be provided with simply two polar projections at each set of field-magnets. So also the magnets in each set may be separate and each present like polar extensions to the armature, one set of said extensions being staggered in relation to the other set, the armature projections remaining in alignment. The armature may also be a permanent magnet and the armature exciting-coil be omitted, the reversals of polarity taking place in the field-coils. Other changes in details may likewise be made without departing from the spirit of my invention.

What I claim as my invention is—

1. In an electric motor, the combination of several sets of field-coils in which the polar extensions of each set are arranged in groups of like poles, an armature whose polar projections are grouped in a like manner, the projections of each group being staggered in relation to the corresponding projection in another group, and a fixed armature-coil consisting of sections with alternately-reversed windings.

2. In an electric motor, the combination of an unwound armature provided with polar projections of which those of like signs are grouped together, a fixed armature-coil consisting of sections with alternately-reversed windings, field-magnets whose polar extensions are formed in groups of like signs, and means for changing the relative polarities of said projections and extensions.

3. In an electric motor, the combination of an unwound armature provided with polar projections, field-magnets provided with polar extensions formed in groups of like signs, an armature exciting-coil in fixed relation to the field-poles, and consisting of several sections wound in alternately-reversed directions, and means for reversing the relative direction of currents in the armature exciting-coil and field-coil respectively.

4. In an electric motor, the combination of an unwound armature, provided with polar projections, field-magnets in groups of two, the polar extensions thereof being formed in groups of like signs, an armature exciting-circuit having adjacent sections thereof reversely wound and one located at each set of field-magnets, and means for reversing the relative directions of the currents in the armature exciting-coils and field-coils respectively.

5. In a rotary motor, the combination of an armature provided with polar projections, of a set of field-magnets each of which has a pole-piece consisting of a ring provided with a series of polar extensions, all of which in each ring are of like signs, and means for changing the relative polarities of said projections and extensions, respectively.

6. In a rotary motor, the combination with a field-magnet of a pole-piece therefor consisting of a ring provided with internal polar extensions.

7. In a rotary motor, the combination of an armature divided into two or more portions, two series of polar projections on each portion, an exciting-coil for determining the polarities of said series, two sets of field-magnets each set having its polar extensions in groups of like signs, the polar projections of one sign being staggered with relation to those of a like sign, and means for changing the relative polarities of said projections and extensions respectively.

8. In an electric motor, the combination with field-magnets arranged in sets and provided with ring pole-pieces, of armature exciting-coils located between the rings of each set of field-coils, an unwound armature having the portion thereof located at the different sets of field-coils insulated from each other, and a commutator for reversing the relative directions of the currents in the armature exciting-coils and field-coils respectively.

9. The combination with an armature extension, of a block of insulation inserted therein, and the commutator-halves secured to said extensions at the ends of said insulation and having their overlapping portion embedded in the surface thereof.

10. The combination with the field-magnet pole-pieces, and the commutator of an arm sleeved upon the armature extensions and secured to a post projecting from said pole-pieces and the yoke for the commutator-brushes secured upon said sleeve.

11. In an electric-railway motor, an armature consisting of a sleeve provided with polar projections and mounted in an insulated manner upon the car-axle, and having its coil mounted in a fixed position independently of the axle.

Signed at Boston, in the county of Suffolk and State of Massachusetts, this 21st day of December, A. D. 1893.

JOHN H. GUEST.

Witnesses:
KATHARINE M. BULGER,
GEO. L. HUNTRESS,
J. PORTER CROSBY.